US011933068B2

(12) United States Patent
Wang et al.

(10) Patent No.: US 11,933,068 B2
(45) Date of Patent: Mar. 19, 2024

(54) PULL HANDLE STRUCTURE

(71) Applicant: FIVETECH TECHNOLOGY INC., New Taipei (TW)

(72) Inventors: Ting-Jui Wang, New Taipei (TW); Aias Lin, New Taipei (TW)

(73) Assignee: FIVETECH TECHNOLOGY INC., New Taipei (TW)

( * ) Notice: Subject to any disclaimer, the term of this patent is extended or adjusted under 35 U.S.C. 154(b) by 672 days.

(21) Appl. No.: 15/822,354

(22) Filed: Nov. 27, 2017

(65) Prior Publication Data

US 2018/0148951 A1 May 31, 2018

(30) Foreign Application Priority Data

Nov. 29, 2016 (TW) ................................ 105218274

(51) Int. Cl.
*E05B 13/10* (2006.01)
*E05B 5/00* (2006.01)

(52) U.S. Cl.
CPC ................ *E05B 13/10* (2013.01); *E05B 5/00* (2013.01)

(58) Field of Classification Search
CPC .... E05B 13/10; E05B 5/00; E05B 2015/0493; E05C 3/006; E05C 3/04; E05C 3/047; E05C 3/122; E05C 3/14; E05C 19/12; E05C 19/14; E05C 19/145; Y10T 292/57; Y10T 292/1083; Y10T 292/444; Y10S 292/30; Y10S 292/31; Y10S 292/63
USPC ....... 292/336.3, 202, 304, DIG. 30, DIG. 31, 292/DIG. 63
See application file for complete search history.

(56) References Cited

U.S. PATENT DOCUMENTS

| | | | | | |
|---|---|---|---|---|---|
| 584,950 | A * | 6/1897 | Mead | E05C 17/22 | 292/278 |
| 609,214 | A * | 8/1898 | Shaw | E05C 17/32 | 292/263 |
| 924,081 | A * | 6/1909 | Loev | E05C 17/32 | 292/263 |
| 978,658 | A * | 12/1910 | Schnell | E05B 65/0811 | 292/128 |
| 1,029,693 | A * | 6/1912 | Klein | E05C 17/32 | 292/263 |
| 1,854,123 | A * | 4/1932 | Elliott | E05F 11/00 | 292/322 |
| 1,941,459 | A * | 1/1934 | Bock | E05C 9/08 | 292/142 |

(Continued)

FOREIGN PATENT DOCUMENTS

| | | | |
|---|---|---|---|
| CN | 105089349 A | | 11/2015 |
| GB | 904970 | * | 9/1962 |

*Primary Examiner* — Christine M Mills
*Assistant Examiner* — Yahya Sidky
(74) *Attorney, Agent, or Firm* — Schmeiser, Olsen & Watts, LLP

(57) ABSTRACT

A pull handle structure includes a carrier mounted on a first object, a pull handle movably assembled to the carrier, and a limiting section located on the pull handle for connecting to, interfering with or engaging with a second object. By operating the pull handle to move the carrier, the first object can be engaged with or separated from the second object. Therefore, the pull handle structure has the advantages of being securely lockable in place and operable in an easy, convenient, effortless and quick manner.

5 Claims, 15 Drawing Sheets

(56) References Cited

U.S. PATENT DOCUMENTS

| | | | | | | |
|---|---|---|---|---|---|---|
| 2,093,039 | A | * | 9/1937 | Eamon | E05C 17/14 | 292/262 |
| 2,407,900 | A | * | 9/1946 | Irving | E05C 17/32 | 70/93 |
| 2,798,371 | A | * | 7/1957 | Gehrie | E05C 19/14 | 70/73 |
| 2,820,995 | A | * | 1/1958 | Schlueter | E05C 19/105 | 403/182 |
| 2,829,912 | A | * | 4/1958 | Koch | E05C 19/14 | 292/114 |
| 2,853,752 | A | * | 9/1958 | Schlueter | E04B 1/6116 | 403/182 |
| 3,204,993 | A | * | 9/1965 | Swanson | E05C 19/105 | 292/111 |
| 3,478,547 | A | * | 11/1969 | Constable | E05B 65/5269 | 70/71 |
| 3,698,753 | A | * | 10/1972 | Atkinson | E05C 19/14 | 292/247 |
| 3,924,886 | A | * | 12/1975 | Markovitch | E05C 17/04 | 292/263 |
| 3,924,887 | A | * | 12/1975 | Markovitch | E05C 17/32 | 292/283 |
| 4,008,584 | A | * | 2/1977 | Wingert | E05B 65/52 | 70/73 |
| 4,090,727 | A | * | 5/1978 | Busch | E05C 3/10 | 292/111 |
| 4,326,739 | A | * | 4/1982 | Schlueter | E05C 19/14 | 292/247 |
| 4,391,463 | A | * | 7/1983 | Costa Bastart | E05C 17/32 | 292/263 |
| 4,428,153 | A | * | 1/1984 | Klinger | E05C 19/002 | 49/310 |
| 4,540,206 | A | * | 9/1985 | Frame | E05C 19/14 | 292/66 |
| 4,570,816 | A | * | 2/1986 | Ferris | B65D 90/10 | 105/308.2 |
| 4,627,650 | A | * | 12/1986 | Hauschulte | E05C 19/14 | 292/113 |
| 4,632,440 | A | * | 12/1986 | Adrian | E05C 3/048 | 292/210 |
| 4,638,649 | A | * | 1/1987 | Chao | E05B 65/5269 | 292/207 |
| 4,679,833 | A | * | 7/1987 | Dueringer | E05B 65/52 | 292/113 |
| 4,746,151 | A | * | 5/1988 | Hoen | E05B 65/0817 | 292/111 |
| 4,758,031 | A | * | 7/1988 | Wolf | E05C 19/105 | 292/111 |
| 4,762,351 | A | * | 8/1988 | Bowman | E05C 17/32 | 292/263 |
| 4,804,215 | A | * | 2/1989 | Bisbing | E05C 19/14 | 292/113 |
| 4,828,298 | A | * | 5/1989 | Bisbing | E05C 19/14 | 292/113 |
| 4,830,413 | A | * | 5/1989 | Bisbing | E05C 19/14 | 292/247 |
| 4,958,865 | A | * | 9/1990 | Cheng | E05C 19/105 | 24/606 |
| 5,216,905 | A | * | 6/1993 | Sersch | E05C 19/145 | 70/312 |
| 5,244,240 | A | * | 9/1993 | Nordmeyer | E05B 63/0017 | 292/263 |
| 5,370,254 | A | * | 12/1994 | Hardigg | E05C 5/00 | 16/252 |
| 5,461,892 | A | * | 10/1995 | Hsieh | E05C 19/145 | 292/247 |
| 5,511,834 | A | * | 4/1996 | Willems | E05C 19/105 | 292/113 |
| 5,547,234 | A | * | 8/1996 | Kinnanen | B60J 7/1851 | 292/112 |
| 5,605,365 | A | * | 2/1997 | George | E05C 17/166 | 292/263 |
| 5,669,638 | A | * | 9/1997 | Anderson | A47B 87/002 | 292/111 |
| 5,797,635 | A | * | 8/1998 | Willems | E05C 19/105 | 292/111 |
| 5,984,383 | A | * | 11/1999 | Parikh | E05B 1/0092 | 292/216 |
| 6,050,616 | A | * | 4/2000 | Evans | E05C 19/105 | 292/109 |
| 6,145,351 | A | * | 11/2000 | Levenson | E05B 45/06 | 292/263 |
| 6,457,750 | B1 | * | 10/2002 | Sokurenko | E05C 19/14 | 292/113 |
| 6,547,293 | B1 | * | 4/2003 | Cheng | E05C 19/14 | 292/113 |
| 7,156,429 | B2 | * | 1/2007 | Eriksson | F16B 2/185 | 292/113 |
| 7,454,933 | B1 | * | 11/2008 | Paige | E05B 5/003 | 292/DIG. 31 |
| 7,568,739 | B2 | * | 8/2009 | Lee | B25H 3/02 | 220/324 |
| 8,104,802 | B2 | * | 1/2012 | Hollebone | E05C 19/105 | 292/194 |
| 8,567,828 | B2 | * | 10/2013 | Andren | A45C 13/02 | 292/66 |
| 8,733,803 | B2 | * | 5/2014 | Drumm | E05C 19/105 | 292/114 |
| 8,939,476 | B2 | * | 1/2015 | Tang | E05C 17/32 | 292/251.5 |
| 9,103,145 | B2 | * | 8/2015 | Hatton | E05C 19/145 | |
| 9,222,291 | B2 | * | 12/2015 | Kakita | E05C 19/14 | |
| 2002/0149208 | A1 | * | 10/2002 | Zamberg | E05C 19/105 | 292/98 |
| 2005/0046319 | A1 | * | 3/2005 | Chekal | F25D 11/02 | 312/401 |
| 2006/0185406 | A1 | * | 8/2006 | Willems | E05C 19/105 | 70/208 |
| 2007/0056231 | A1 | * | 3/2007 | DiMario | B60J 1/10 | 52/204.53 |
| 2007/0182167 | A1 | * | 8/2007 | Garofoli | E05B 1/00 | 292/336.3 |
| 2008/0238110 | A1 | * | 10/2008 | Hatton | E05C 19/105 | 292/203 |
| 2008/0250719 | A1 | * | 10/2008 | Griffin | E05C 9/22 | 49/339 |
| 2009/0295175 | A1 | * | 12/2009 | Hatton | E05B 17/0025 | 292/203 |
| 2010/0043504 | A1 | * | 2/2010 | Minter | E05C 9/22 | 70/89 |
| 2012/0056450 | A1 | * | 3/2012 | DiMario | B60J 1/006 | 296/224 |
| 2014/0042755 | A1 | * | 2/2014 | Goodman | E05C 19/105 | 292/65 |
| 2015/0315811 | A1 | | 11/2015 | Mao et al. | | |
| 2016/0090761 | A1 | * | 3/2016 | Ro | E05C 3/145 | 292/129 |

* cited by examiner

PULL HANDLE STRUCTURE

CROSS-REFERENCE TO RELATED APPLICATION

This non-provisional application claims priority under 35 U.S.C. § 119(a) on Patent Application No(s). 105218274 filed in Taiwan, R.O.C. on Nov. 29, 2016, the entire contents of which are hereby incorporated by reference.

FIELD OF THE INVENTION

The present invention relates to a pull handle structure, and more particularly, to a pull handle structure connected to a first object and a second object and operable to open the first object or close and lock the same to the second object.

BACKGROUND OF THE INVENTION

Many objects are provided with a handle. A user may grip the handle on an object and apply a pull or push force, and the object can be more easily connected to or separated from another object. For example, the currently available server chassis usually includes one or more handles provided on a chassis cover thereof to facilitate easy engagement and separation of the chassis cover with or from the chassis.

However, the handles of different objects are normally directly provided on an outer side of the objects without secure locking mechanism. Therefore, the handles are subjected to the risk of being wrongly operated, such as being undesirably moved to open the chassis cover.

Further, there are also flush swing handles that can be pushed and flatly attached to the object when the handles are not in use. On the other hand, the handle can be pulled outward for use when necessary.

However, the flush swing handles according to the existing technical designs are not provided with the secure locking function, either. That is, the flush swing handles still have the risk of being arbitrarily or wrongly pulled for use. Also, with the currently available handle designs, a user has to apply a considerable force on the handle to connect or separate the object with the handle to or from another object. In other words, the currently available handle designs do not include any labor-saving mechanism in the handles.

It is therefore tried by the inventor to develop a pull handle structure that can be turned to a folded position and securely locked thereto when it is not in use, and can be quickly unlocked and extended for use when necessary. Further, the pull handle structure employs the lever principle, so that the handle being pivotally turned enables effortless connection and separation of the object with the handle to and from another object.

SUMMARY OF THE INVENTION

In view of the disadvantages of the existing handle structures, it is tried by the inventor to develop a pull handle structure that includes a lever structure enabling effortless operation of the pull handle structure, and a secure locking structure enabling secure locking and easy, convenient, effortless and quick operation of the pull handle structure.

To achieve the above and other objects, the pull handle structure provided according to an embodiment of the present invention includes a carrier mounted on a first object, a pull handle movably assembled to the carrier, and a limiting section located on the pull handle for connecting to, interfering with or engaging with a second object.

The pull handle structure provided according to another embodiment of the present invention includes a carrier being mounted on a first object and having a hole portion; a pull handle being movably assembled to the carrier; and a limiting section being located on the pull handle for connecting to, interfering with or engaging with a second object. The second object has a corresponding limiting section for extending through the hole portion to engage with and limit the limiting section, or the limiting section is extended through the hole portion to engage with and limit the corresponding limiting section.

The pull handle structure provided according to a further embodiment of the present invention includes a carrier being mounted on a first object and having a hole portion; a pull handle being movably assembled to the carrier; and a limiting section being located on the pull handle for connecting to, interfering with or engaging with a second object. The second object has a corresponding limiting section. The corresponding limiting section is extended through and movable in the hole portion or the limiting section is extended through and movable in the hole portion, so as to define an opened and a closed position of the first object relative to the second object or to engage the corresponding limiting section with the limiting section for them to limit each other's movement.

The pull handle structure provided according to a still further embodiment of the present invention includes a carrier and a pull handle. The pull handle is movably assembled to the carrier, and the carrier is mounted on a first object.

The pull handle structure provided according to another still further embodiment of the present invention includes a carrier being mounted on a first object and having a hole portion; a pull handle being movably assembled to the carrier; and a limiting section being located on the carrier for connecting to, interfering with or engaging with a second object.

In the pull handle structure according to the above first-mentioned embodiment, the carrier has a hole portion, the second object has a corresponding limiting section, and the corresponding limiting section of the second object is extended through the hole portion.

In the pull handle structure according to the above first-mentioned embodiment, the hole portion can be elongated in shape, a structure with unequal length and width, a round structure, a structure with equal length and width, a long structure, a recessed section, a recess, a through hole or a long slot.

In the pull handle structure according to the above first-mentioned embodiment, the corresponding limiting section can be post-shaped, block-shaped, step-shaped, a protruded section, a recessed section, a hole portion, a grooved section, a flat surface, a cambered surface, a beveled section, a retaining member, a fastening hook member or a male retaining member.

In the pull handle structure according to the above embodiments, the limiting section is snap-fitted onto, extended through, screwed to, operated as a lever against, fitted around, pressed against, latched to, linearly moved against, rolled over, pushed against or slid on the second object to thereby connect to, interfere with or engage with the second object.

In the pull handle structure according to the above embodiments, the first object can have first assembling sections or the second object can have second assembling sections.

In the pull handle structure according to the above embodiments, the first assembling sections and the second assembling sections can be mutually interfered with, engaged with or connected to one another.

In the pull handle structure according to the above embodiments, the pull handle can have a holding section or the carrier has a corresponding holding section.

In the pull handle structure according to the above embodiments, the limiting section can be a sunken hole, a recess, a through hole, a recessed section, a protruded section, a post, a rod, a cambered member, a push-pull member, a hooking member, a flat member, a protrusion, a shaft, a wheel-like member, an externally threaded member, a female retaining member, a male retaining member, an internally threaded member, a block, a stepped section or a retaining member.

In the pull handle structure according to the above embodiments, the limiting section can have a first limiting portion or a second limiting portion adapted to separate from or interfere with the second object, or bring the first object to move or return to an initial position, or bring the second object to move or return to an initial position.

In the pull handle structure according to the above embodiments, the pull handle can have a corresponding coupling section or the carrier has a coupling section.

In the pull handle structure according to the above embodiments, the corresponding coupling section and the coupling section can be mutually movably coupled to each other.

In the pull handle structure according to the above embodiments, the corresponding coupling section and the coupling section can be respectively a post, a retaining member, a hooking member, a protrusion, a recessed member, a groove or a through hole.

In the pull handle structure according to the above embodiments, the carrier can have fixing sections, at where the carrier is fixed to the first object.

In the pull handle structure according to the above embodiments, the pull handle can have a stop section for abutting on the carrier.

In the pull handle structure according to the above embodiments, the carrier can have an abutted section, against which the pull handle is abutted and pressed.

In the pull handle structure according to the above embodiments, the limiting section and the pull handle can be integrally formed with or movably assembled to each other, or movably assembled to each other via a shaft.

In the pull handle structure according to the above embodiments, when the pull handle can be pivotally turned, the limiting section can be axially, horizontally or vertically moved.

In the pull handle structure according to the above embodiments, the limiting section can be moved to separate from or interfere with the second object.

In the pull handle structure according to the above embodiments, an elastic member can be provided between and pressed against the carrier and the limiting section.

In the pull handle structure according to the above embodiments, the second object is connected to or interfered with or engaged with or separated from the limiting section via the corresponding limiting section.

In the pull handle structure according to the above embodiments, the corresponding limiting section can be a recessed section, a recess, a through hole, a protruded section, a post, a rod, a cambered member, a push-pull member, a hooking member, a flat member, a protrusion, a shaft, a wheel-like member, an externally threaded member, a female retaining member, a male retaining member, an internally threaded member, a block, a stepped section or a retaining member.

In the pull handle structure according to the above embodiments, the carrier or the pull handle can have an elastic member; and the elastic member is pressing against the carrier or the pull handle, so that the pull handle is elastically movable or elastically turnable.

In the pull handle structure according to the above embodiments, the carrier and the first object can be integrally formed with each other.

In the pull handle structure according to the above embodiments, the hole portion limits the corresponding limiting section or the limiting section to a linear limiting movement, a horizontal movement or a vertical movement in the hole portion.

In the pull handle structure according to the above embodiments, the limiting section can be interfered with, connected to or engaged with the corresponding limiting section of the second object, and the corresponding limiting section can be limited to a lateral end of the hole portion of the carrier or a linearly lateral side of the hole portion for holding the first object in place.

In the pull handle structure according to the above embodiments, the carrier can have a stop section or the pull handle can have a corresponding stop section; and the stop section and the corresponding stop section can be mutually interfered with or engaged with each other to limit the pull handle from moving out of the carrier.

In the pull handle structure according to the above embodiments, the hole portion of the carrier can include a widened passage section or a narrowed locating section communicably connected to the passage section.

In the pull handle structure according to the above embodiments, the corresponding limiting section can include a neck portion, or includes a head portion and a neck portion, for extending through the passage section or the locating section.

In the pull handle structure according to the above embodiments, the passage section has a size larger than the corresponding limiting section, or the locating section has a size smaller than the head portion but larger than the neck portion of the corresponding limiting section.

In the pull handle structure according to the above embodiments, the carrier can include a limiting section, which can be a protruded retaining member, a fastening hook member, a protrusion, a retaining member, a rod, a hole portion, an elongated hole portion, a recessed section, a recess, a long grooved section or a grooved section for connecting to, interfering with or engaging with a corresponding limiting section of a second object.

In the pull handle structure according to the above embodiments, the corresponding limiting section can include a widened passage section or a narrowed locating section communicably connected to the passage section.

In the pull handle structure according to the above embodiments, the limiting section can include a neck portion, or includes a head portion and a neck portion; and the neck portion being configured for engaging with the locating section or the passage section.

In the pull handle structure according to the above embodiments, the limiting section can include a widened passage section, or a narrowed locating section, or a narrowed locating section communicably connected to the passage section.

In the pull handle structure according to the above embodiments, the corresponding limiting section can include a neck portion, or can include a head portion and a neck portion; and the neck portion being configured for engaging with the locating section or the passage section.

In the pull handle structure according to the above embodiments, the limiting section and the corresponding limiting section can be engaged with each other for a linear limiting movement, a horizontal movement or a vertical movement.

With the pull handle structure of the present invention, the pull handle can be operated to move the carrier, so that the first object is engaged with or separated from the second object. Therefore, the pull handle structure has the advantages of being securely lockable in place and operable in an easy, convenient, effortless and quick manner.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
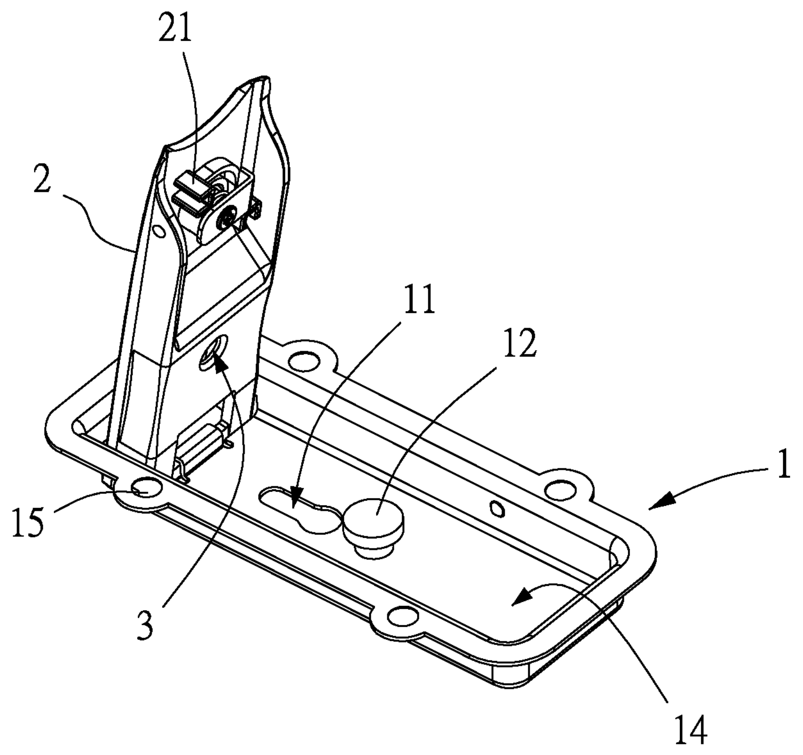
FIG. 1 is a perspective view of a pull handle structure according to a first embodiment of the present invention.

The present invention will now be described with some preferred embodiments thereof and by referring to the accompanying drawings. For the purpose of easy to understand, elements that are the same in the preferred embodiments are denoted by the same reference numerals.

Figure 2:
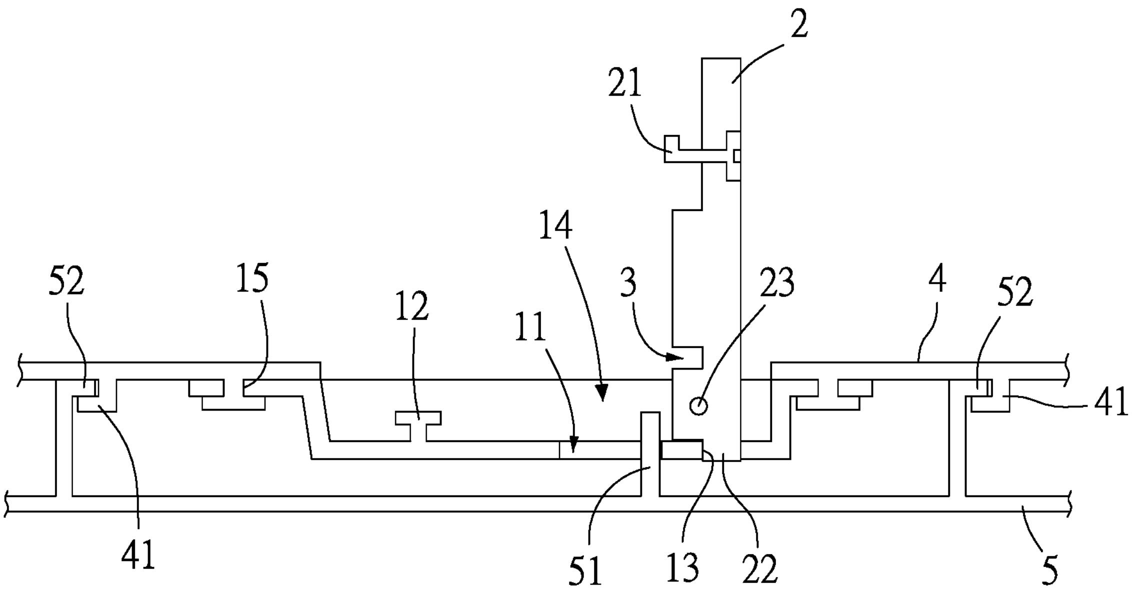
FIG. 2 is a sectional view of the pull handle structure according to the first embodiment of the present invention.
Figure 3:
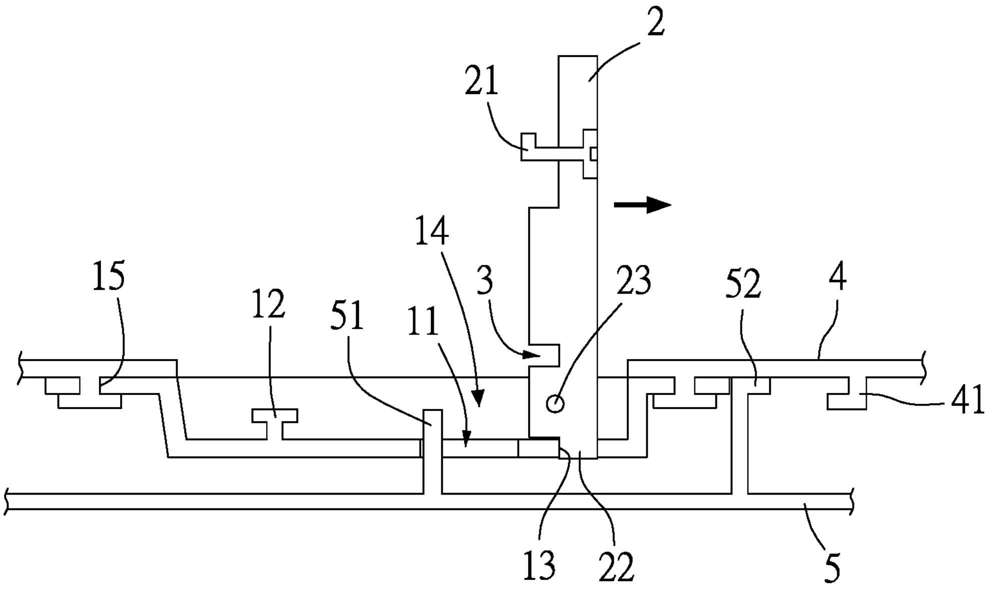
FIG. 3 is a sectional view showing the manner of using the pull handle structure according to the first embodiment of the present invention.
Figure 4:
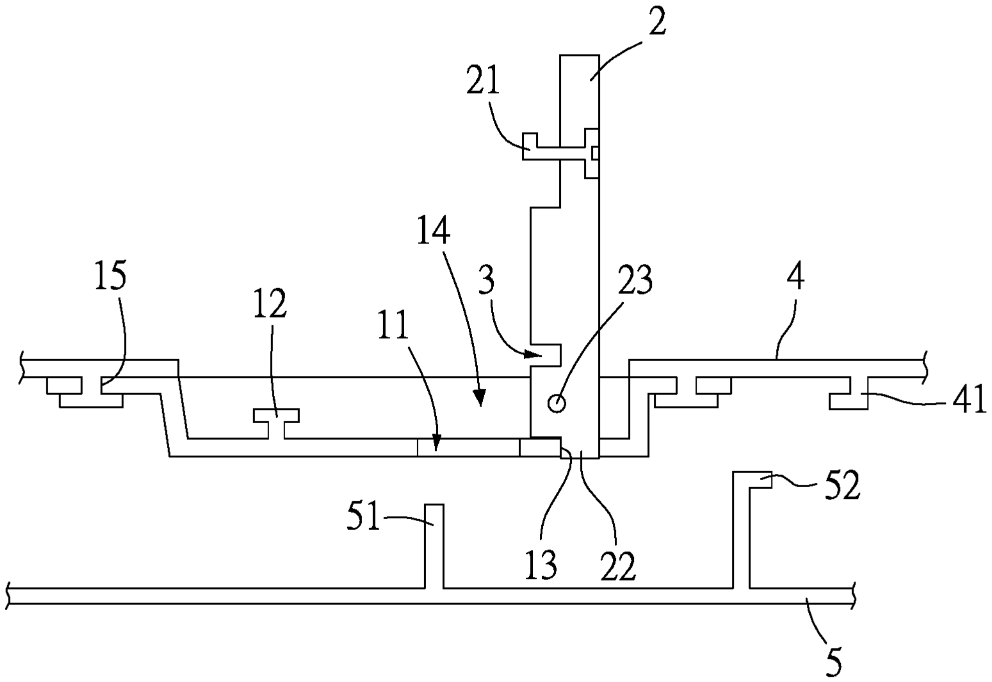
FIG. 4 is a sectional view showing the manner of using the pull handle structure according to the first embodiment of the present invention.
Figure 5:
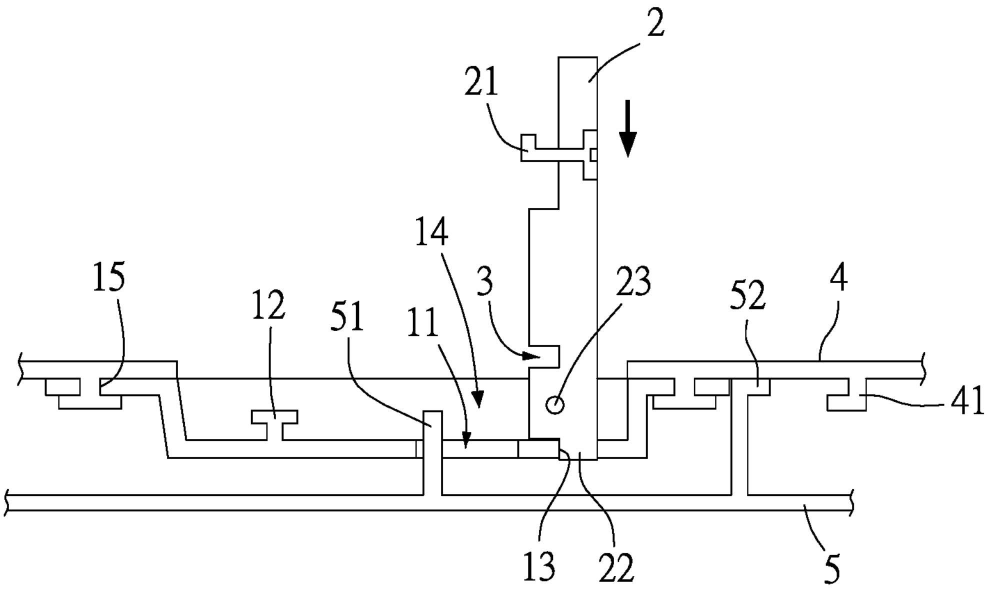
FIG. 5 is a sectional view showing the manner of using the pull handle structure according to the first embodiment of the present invention.
Figure 6:
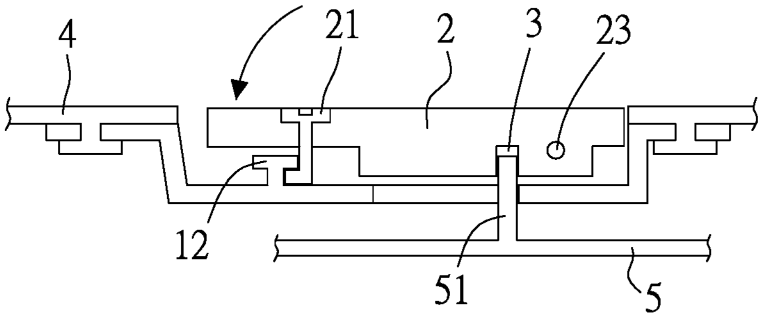
FIG. 6 is a sectional view showing the manner of using the pull handle structure according to the first embodiment of the present invention.

Please refer to FIGS. 1 and 2 that are perspective and sectional views, respectively, of a pull handle structure according to a first embodiment of the present invention. As shown, the pull handle structure in the first embodiment includes at least a carrier 1, a pull handle 2 and a limiting section 3.

The carrier 1 is configured for mounting on a first object 4 and has a hole portion 11 and a corresponding holding section 12. The hole portion 11 has a length between 1 mm and 250 mm and can be elongated in shape, a structure with unequal length and width, a round structure, a structure with equal length and width, a long structure, a recessed section, a recess, a through hole or a long slot. The corresponding holding section 12 can be a retaining member, a locking member, a protrusion, a recessed member, a groove, a flat member, a through hole, an elastic member, a post, a latch, a plate or a hooking member. The carrier 1 further includes an abutted section 13, which can be a plate, a block, a post, a protrusion, a recessed member, a flat member, a cambered member or a beveled member. The first object 4 has first assembling sections 41, each of which can be a hooking member, a retaining member, a groove, a hole, a protrusion, a recessed member, a flat member, a cambered member or a through hole. The carrier 1 defines a recess 14 for receiving the pull handle 2 therein. The first object 4 can be a board, a plate, a block, a panel, a chassis top cover, a cover, a rack, a support, a door leaf or a jamb. And, the carrier 1 further includes fixing sections 15, at where the carrier 1 is fixed to the first object 4.

The pull handle 2 is movably assembled to the carrier 1 and includes a holding section 21 for engaging with, interfering with or connecting to the corresponding holding section 12 on the carrier 1. The holding section 21 can be a retaining member, a locking member, a protrusion, a recessed member, a groove, a flat member, a through hole, an elastic member, a post, a latch, a plate or a hooking member. The pull handle 2 further includes a stop section 22 for abutting on the abutted section 13 of the carrier 1 to thereby press against the carrier 1. The stop section 22 can be a plate, a block, a post, a protrusion, a recessed member, a flat member, a cambered member or a beveled member.

Figure 7:
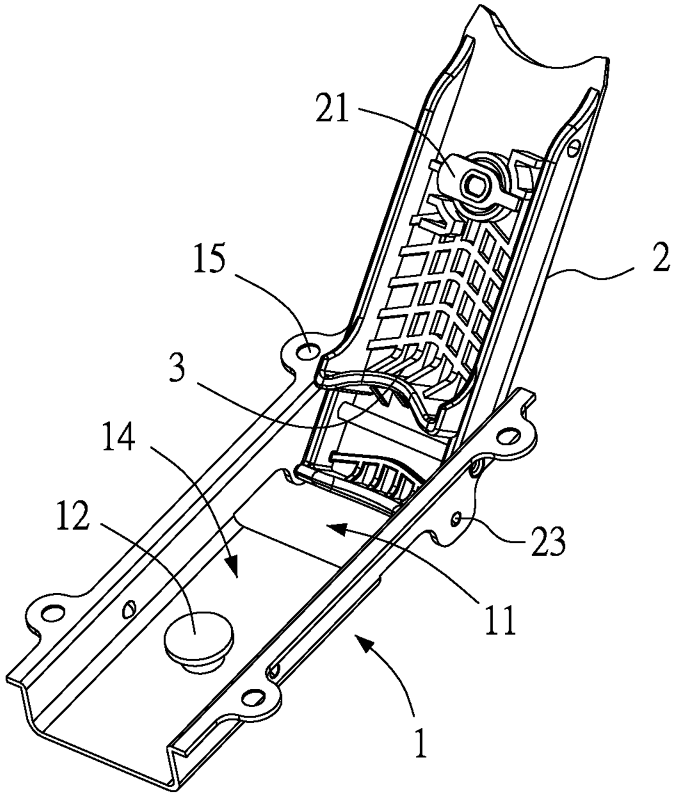
FIG. 7 is another perspective view of a pull handle structure according to a first embodiment of the present invention.

The limiting section 3 is located on the pull handle 2 and can be a sunken hole, a recess, a through hole, a recessed section, a protruded section (FIG. 7), a post, a rod, a cambered member (FIG. 7), a push-pull member, a hooking member, a flat member, a protrusion (FIG. 7), a shaft, a wheel-like member, an externally threaded member, a female retaining member, a male retaining member, an internally threaded member, a block, a stepped section or a retaining member. The limiting section 3 is snap-fitted onto, extended through, screwed to, operated as a lever against, fitted around, pressed against, latched to, linearly moved against, rolled over, pushed against or slid on the second object to thereby connect to, interfere with or engage with the second object. The second object 5 includes a corresponding limiting section 51 that can be extended through the hole portion 11 on the carrier 1 to engage with the limiting section 3, or can be engaged with the limiting section 3 that is extended through the hole portion 11 (FIG. 7). The corresponding limiting section 51 can be post-shaped, block-shaped, step-shaped, a protruded section, a hole portion, a grooved section, a flat surface, a cambered surface, a beveled section, a recess, a through hole, a post, a rod, a cambered member, a push-pull member, a hooking member, a fastening hook member, a flat member, a protrusion, a shaft, a wheel-like member, an externally threaded member, a retaining member, a female retaining member, a male retaining member, an internally threaded member, a block or a stepped section. The second object 5 has second assembling sections 52 for interfering with, engaging with or connecting to the first assembling sections 41. Each of the second assembling sections 52 can be a hooking member, a retaining member, a groove, a holed member, a protrusion, a recessed member, a flat member, a cambered member or a through hole. The second object 5 can be a box, a cabinet, a post, a block, a plate, a board, a rack, a support, a chassis, an enclosure, a jamb, a door leaf or a cover.

The corresponding limiting section 51 is extended through and movable in the hole portion 11 to define an opened and a closed position of the first object 4 relative to the second object 5. Or, the corresponding limiting section 51 can be engaged with the limiting section 3, so that the second object 5 is connected to, interfered with, engaged with or separated from the limiting section 3 via the corresponding limiting section 51. The hole portion 11 can limit the corresponding limiting section 51 or the limiting section 3 to a linear limiting movement, a horizontal movement or a vertically movement in the hole portion 11. A distance by which the corresponding limiting section 51, the limiting section 3, the first assembling sections 41 and the second assembling sections 52 can be linearly moved is from 0 mm to 200 mm. In addition, the pull handle structure and the first object 4 can together form a module; or the pull handle structure and the first and the second object 4, 5 can together form a module; or the carrier 1 of the pull handle structure and the first object 4 can be integrally formed with each other.

Please refer to FIGS. 1 to 6, wherein FIGS. 3 to 6 are sectional views showing the manner of using the pull handle structure according to the first embodiment of the present invention. For example, to use and operate the pull handle structure of the present invention shown in FIG. 1, first move the pull handle 2 out of the recess 14 of the carrier 1, so that the stop section 22 of the pull handle 2 is abutted on and stopped by the abutted section 13 of the carrier 1 and the limiting section 3 is separated from the corresponding limiting section 51. At this point, the corresponding limiting section 51 is movable linearly, horizontally or vertically in the hole portion 11 to displace. Then, apply a force toward one side of the pull handle 2 for the corresponding limiting section 51 to move within the hole portion 11, such that the first assembling sections 41 of the first object 4 are disengaged from the second assembling sections 52 of the second object 5. Thereafter, the pull handle 2 can be pulled upward to separate the carrier 1 and the first object 4 from the second object 5.

On the other hand, to connect the first object 4 to the second object 5, first align the hole portion 11 of the carrier 1 with the corresponding limiting section 51 of the second object 5, and apply a force toward an opposite side of the pull handle 2 for the corresponding limiting section 51 to move within the hole portion 11, such that the first assembling sections 41 of the first object 4 are engaged with the second assembling sections 52 of the second object 5. Thereafter, turn the pull handle 2 into the recess 14 of the carrier 1. At this point, the limiting section 3 is engaged with the corresponding limiting section 51 of the second object 5 to hold the first object 4 in place. Then, move the corresponding limiting section 51 to a lateral end of the hole portion 11, i.e. to a linearly lateral side of the hole portion 11, so as to hold the first object 4 in place relative to the second object 5. Meanwhile, the holding section 21 of the pull handle 2 is retained to the corresponding holding section 12 of the carrier 1 to hold the pull handle 2 to the recess 14 of the carrier 1. At this point, the connection of the first object 4 to the second object 5 is completed.

Figure 8:
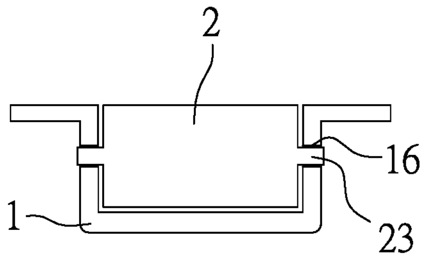
FIG. 8 is a sectional view of a pull handle structure according to a second embodiment of the present invention.
Figure 9:
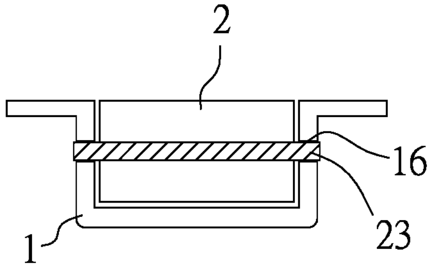
FIG. 9 is a sectional view of a pull handle structure according to a third embodiment of the present invention.
Figure 10:
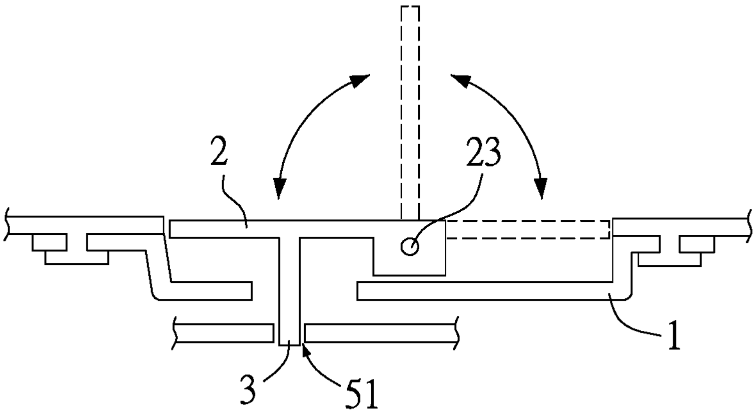
FIG. 10 is a sectional view of a pull handle structure according to a fourth embodiment of the present invention.

FIGS. 8, 9 and 10 are sectional views of a pull handle structure according to a second, a third and a fourth embodiment of the present invention, respectively. As shown, in each of these embodiments, the carrier 1 has a coupling section 16 and the pull handle 2 has a corresponding coupling section 23, which are mutually movably coupled to each other. The corresponding coupling section 23 can be additionally connected to the pull handle 2 or be integrally formed with the pull handle 2. The corresponding coupling section 23 can be a post, a retaining member, a hooking member, a protrusion, a recessed member, a groove or a through hole. The coupling section 16 can be additionally connected to the carrier 1 or be integrally formed with the carrier 1. The coupling section 16 can be a post, a retaining member, a hooking member, a protrusion, a recessed member, a groove or a through hole. Through the mutually movable coupling of the corresponding coupling section 23 with the coupling section 16, the pull handle 2 can be pivotally turned by an angle between 0 and 180 degrees relative to the carrier 1. In these embodiments, the limiting section 3 can be a post and the corresponding limiting section 51 can be a through hole, as shown in FIG. 10.

Figure 11:
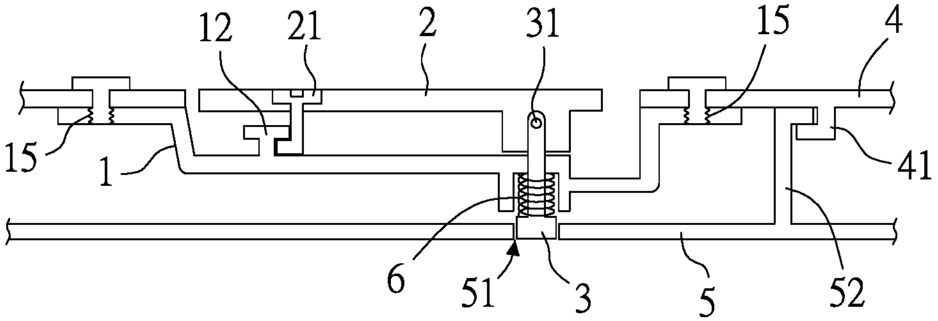
FIG. 11 is a sectional view of a pull handle structure according to a fifth embodiment of the present invention.
Figure 12:
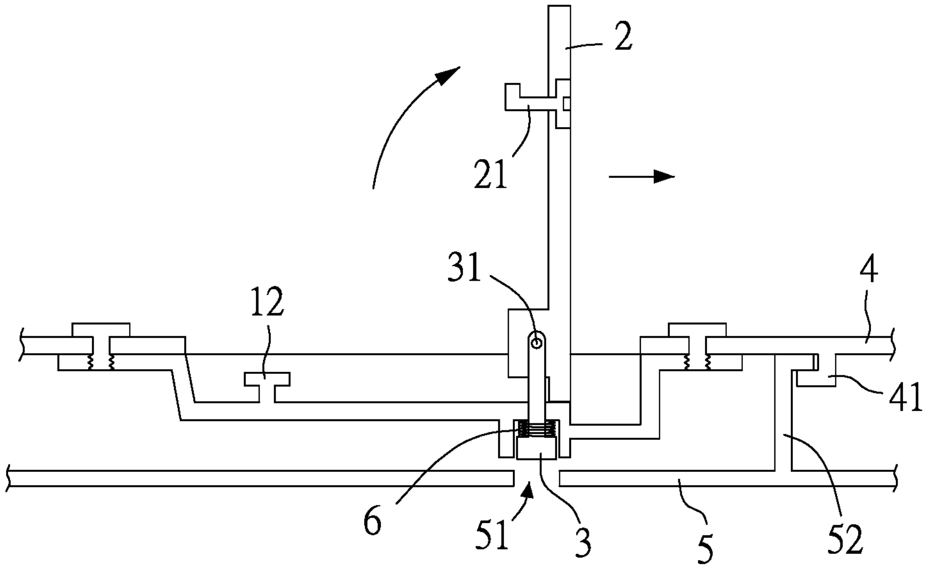
FIG. 12 is a sectional view of a pull handle structure according to a fifth embodiment of the present invention.
Figure 13:
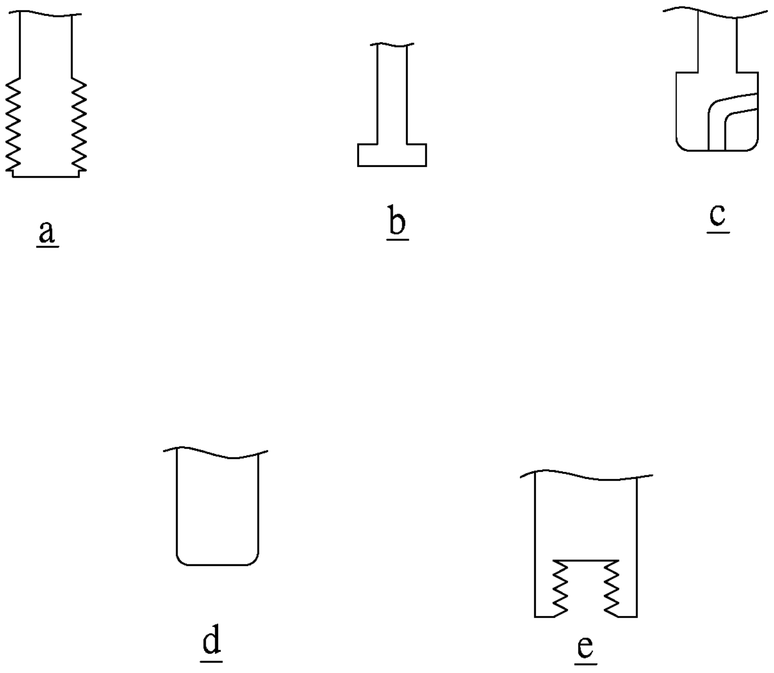
FIG. 13 shows different configurations available for a limiting section provided on the pull handle structure of the present invention.

FIGS. 11 and 12 are sectional views of a pull handle structure according to a fifth embodiment of the present invention; and FIG. 13 shows different configurations available for the limiting section provided on the pull handle structure of the present invention. Please refer to FIGS. 11, 12 and 13. In the fifth embodiment, the carrier 1 includes fixing sections 15, at where the carrier 1 is fixed to the first object 4. Each of the fixing sections 15 can be a through hole, a recessed member, a groove, a retaining member, an elastic member, a plug-in member or a weldable member, or can be fixed to the first object 4 via another retaining member. Also, in the fifth embodiment, the limiting section 3 is movably assembled to the pull handle 2 via a shaft 31 or is integrally formed with the pull handle 2, so that the limiting section 3 moves along with the pull handle 2 when the latter is pivotally turned. When the pull handle 2 is pivotally turned, the limiting section 3 is axially, horizontally or vertically moved. Further, an elastic member 6 is fitted around the limiting section 3 and located between the carrier 1 and the limiting section 3 for normally pressing against the carrier 1, so that the pull handle 2 is elastically movable or turnable. In the fifth embodiment, the limiting section 3 can be an externally threaded member, as shown in a of FIG. 13; a male retaining member, as shown in b of FIG. 13; a female retaining member, as shown in c of FIG. 13; a post, as shown in d of FIG. 13; or an internally threaded member, as shown in e of FIG. 13.

Figure 14:
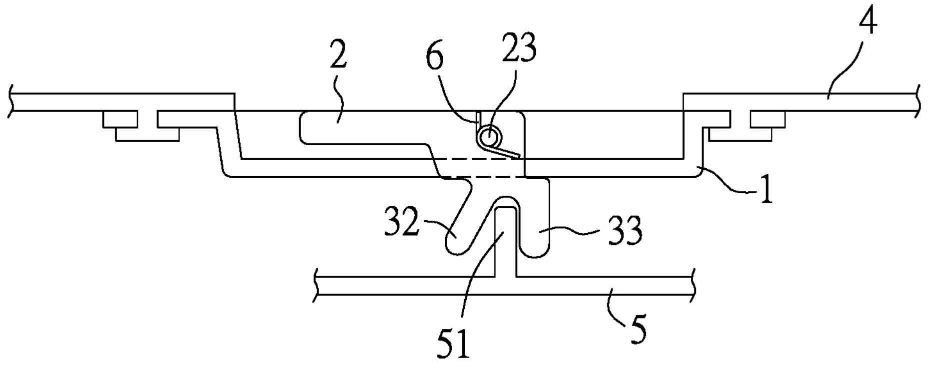
FIG. 14 is a sectional view of a pull handle structure according to a sixth embodiment of the present invention.
Figure 15:
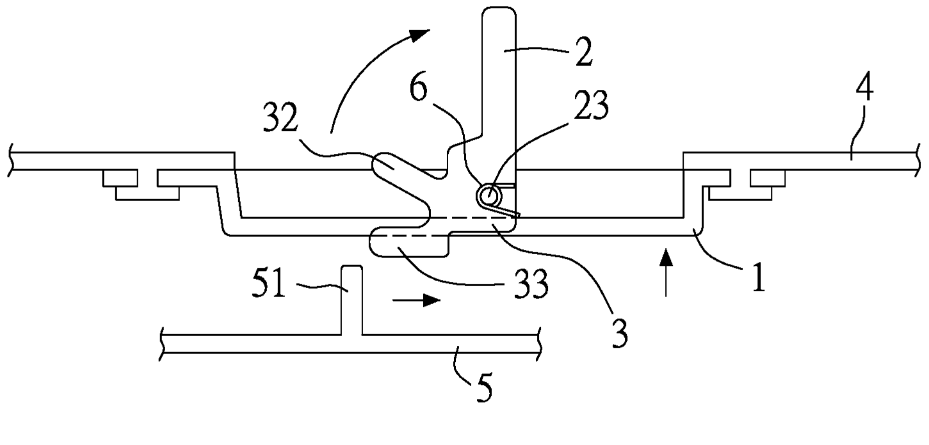
FIG. 15 is a sectional view of a pull handle structure according to a sixth embodiment of the present invention.

Please refer to FIGS. 14 and 15, which are sectional views of a pull handle structure according to a sixth embodiment of the present invention. As shown, in the sixth embodiment, the limiting section 3 includes a first limiting portion 32 or a second limiting portion 33. The first limiting portion 32 or the second limiting section 33 can be engaged with or separated from the corresponding limiting section 51, so as to interfere with or separate from the second object 5, or bring the first object 4 to move or return to an initial position, or bring the second object 5 to move or return to an initial position. Further, an elastic member 6 is provided on a corresponding coupling section 23 of the pull handle 2 with two ends pressing against the carrier 1 and the pull handle 2, allowing the pull handle 2 to be elastically movable or elastically turnable.

Figure 16:
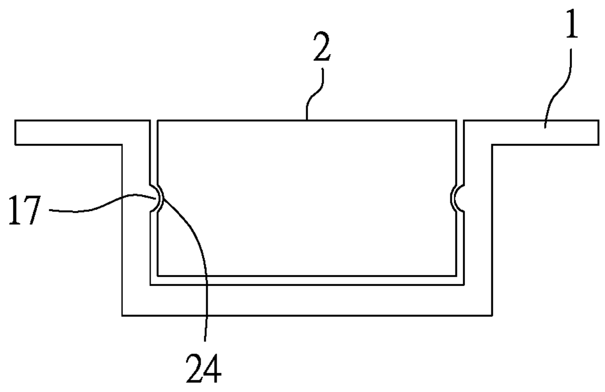
FIG. 16 is a sectional view of a pull handle structure according to a seventh embodiment of the present invention.

FIG. 16 is a sectional view of a pull handle structure according to a seventh embodiment of the present invention. As shown, in the seventh embodiment, the carrier 1 is provided at two inner sidewall surfaces with a stop section 17 each and the pull handle 2 is provided at two outer sidewall surfaces with a corresponding stop section 24 each for interfering with or engaging with the stop section 17, so that the pull handle 2 is not easily moved out of the recess 14 of the carrier. The stop section 17 and the corresponding stop section 24 can be respectively a protrusion, a recessed section, a grooved section, a through hole, a hooking member, a stepped section, a flat section, a beveled section, a cambered section or a retaining member.

Figure 17:
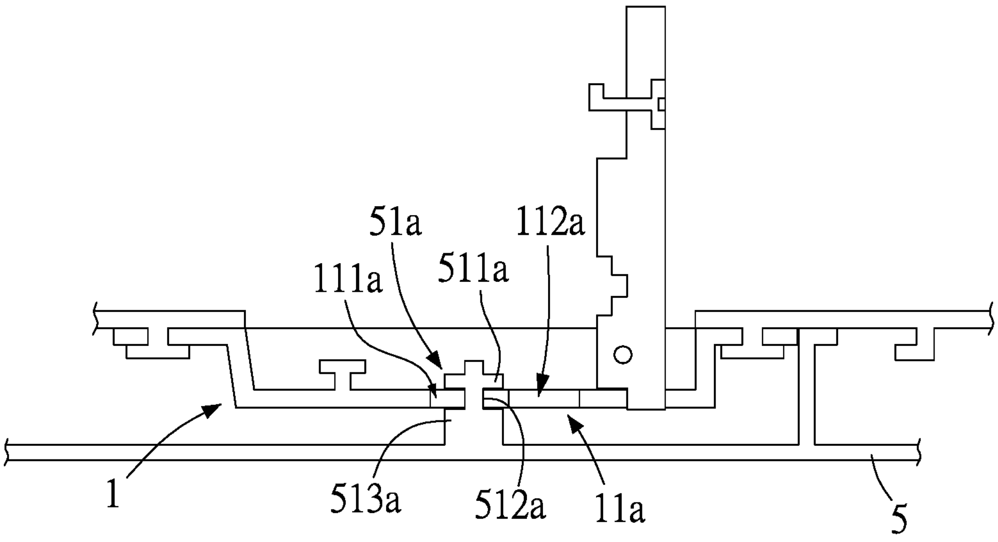
FIG. 17 is a sectional view of a pull handle structure according to an eighth embodiment of the present invention.
Figure 18:
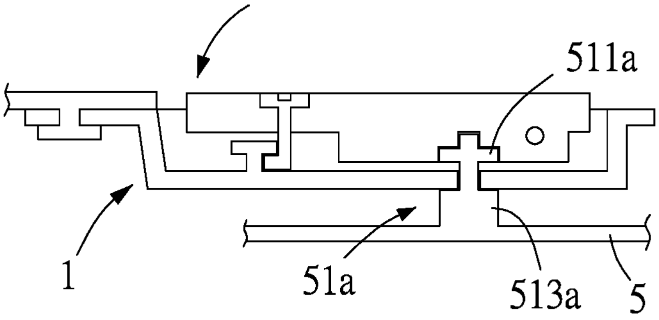
FIG. 18 is a sectional view of a pull handle structure according to an eighth embodiment of the present invention.
Figure 19:
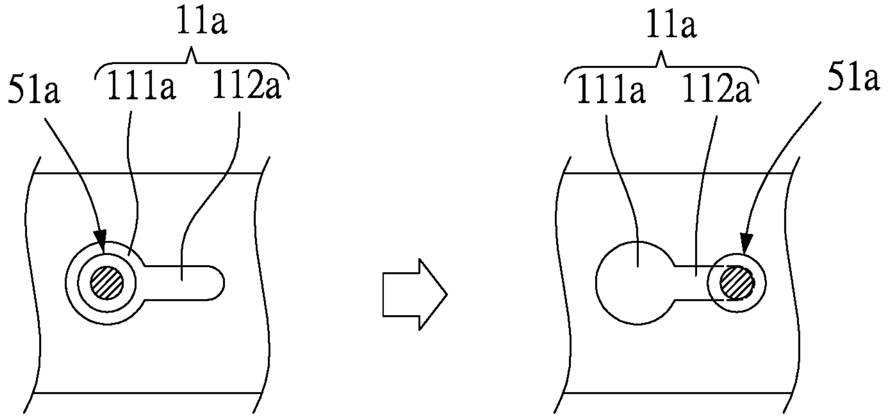
FIG. 19 shows a hole portion on the pull handle structure according to the eighth embodiment of the present invention is engaged with a corresponding limiting section on a second object.

FIGS. 17 and 18 are sectional views of a pull handle structure according to an eighth embodiment of the present invention; and FIG. 19 shows a hole portion on the pull handle structure according to the eighth embodiment of the present invention is engaged with a corresponding limiting section on a second object. As shown, in the eighth embodiment, the carrier 1 has a hole portion 11*a*, which includes a widened passage section 111*a* and a narrowed locating section 112*a* that are communicably connected to each other; and the second object 5 has a corresponding limiting section 51*a*, which includes a head portion 511*a*, a neck portion 512*a* and a shoulder portion 513*a*. Or, according to an operable embodiment, the corresponding limiting section 51*a* includes only the neck portion 512*a* and the shoulder portion 513*a*. The corresponding limiting section 51*a* can be extended through the passage section 111*a* and moved into the locating section 112*a* of the hole portion 11*a* to hold the carrier 1 thereto. The passage section 111*a* has a size larger than the corresponding limiting section 51*a*, and the locating section 112*a* has a width smaller than the head portion 511*a* but larger than the neck portion 512*a* of the corresponding limiting section 51*a*.

Figure 20:
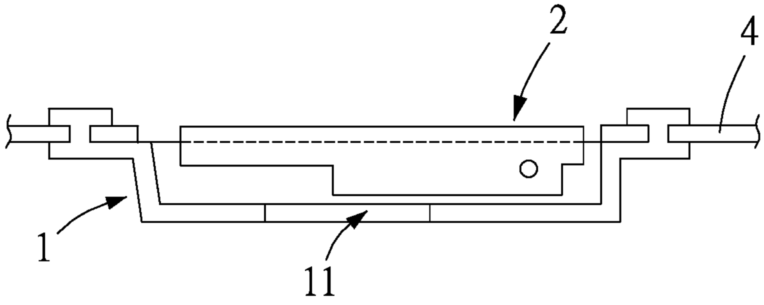
FIG. 20 is a sectional view of a pull handle structure according to a ninth embodiment of the present invention.

Please refer to FIG. 20, which is a sectional view of a pull handle structure according to a ninth embodiment of the present invention. As shown, in the ninth embodiment, the pull handle structure includes a carrier 1 and a pull handle 2 movably assembled to the carrier 1. The carrier 1 is mounted on a first object 4 and is provided with a hole portion 11, via which the carrier 1 is assembled to, interfered with or engaged with a second object (not shown in FIG. 20). In the ninth embodiment, the limiting section 3 is omitted.

Figure 21:
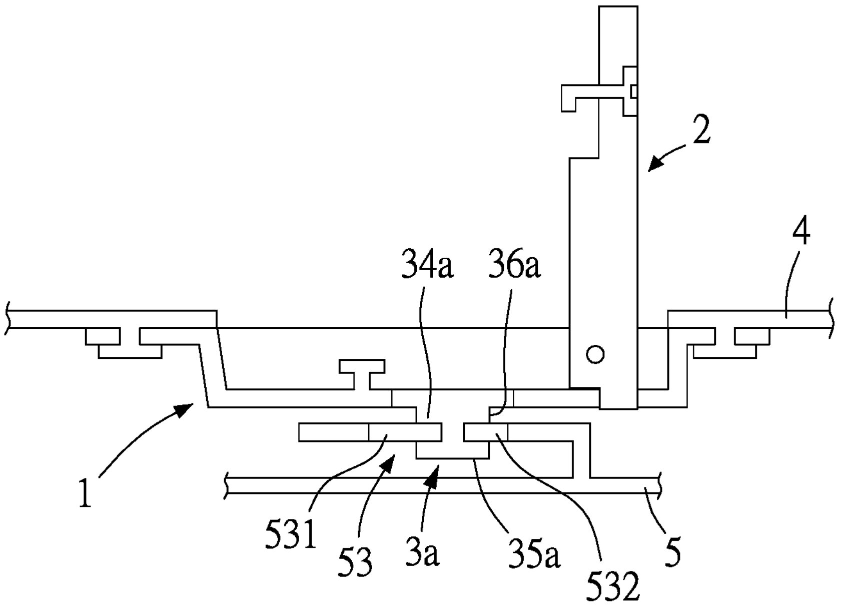
FIG. 21 is a sectional views of a pull handle structure according to a tenth embodiment of the present invention.
Figure 22:
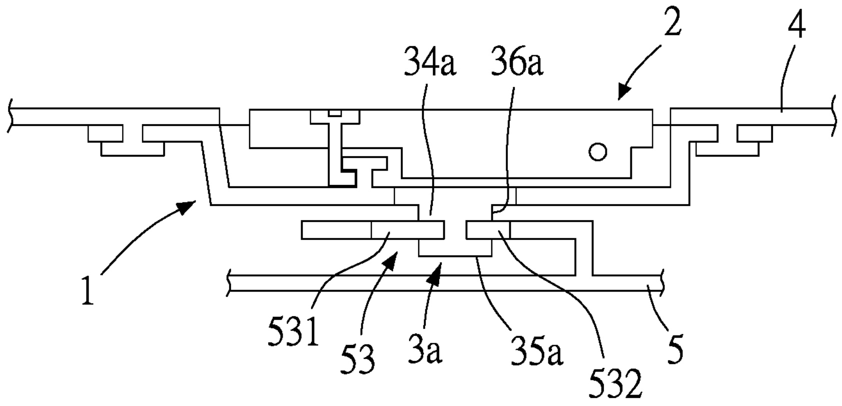
FIG. 22 is a sectional views of a pull handle structure according to a tenth embodiment of the present invention.
Figure 23:
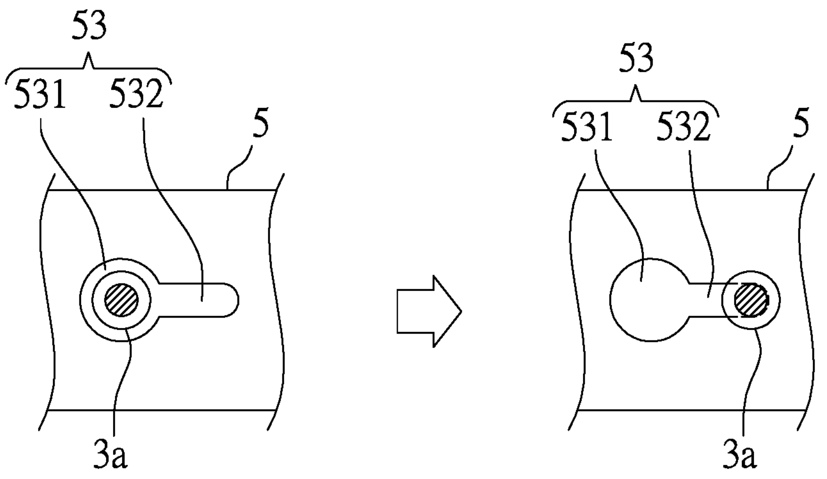
FIG. 23 shows a limiting section on the pull handle structure according to the tenth embodiment of the present invention is engaged with a corresponding limiting section on a second object.

FIGS. 21 and 22 are sectional views of a pull handle structure according to a tenth embodiment of the present invention; and FIG. 23 shows a limiting section on the pull handle structure according to the tenth embodiment of the present invention is engaged with a corresponding limiting section on a second object. As shown, in the tenth embodiment, the pull handle structure includes a carrier 1 mounted on a first object 4, a pull handle 2 movably assembled to the carrier 1, and a limiting section 3*a* provided on the carrier 1 for connecting to, interfering with or engaging with a second object 5. The limiting section 3*a* can be a protruded retaining member, a fastening hook member, a protrusion, a retaining member, a rod, a hole portion, an elongated hole portion, a recessed section, a recess, a long grooved section or a grooved section. And, the limiting section 3*a* can be connected to the carrier 1 by way of riveting, expansion connection, screwing, welding or snap-fitting, or can be integrally formed with the carrier 1. The limiting section 3*a* includes a shoulder portion 34*a* for pressing against the second object 5, a head portion 35*a*, and a neck portion 36*a*. Or, according to an operable embodiment, the limiting section 3*a* includes only the neck portion 36*a*. The second object 5 has a corresponding limiting section 53 corresponding to the limiting section 3*a*. The corresponding limiting section 53 includes a widened passage section 531 and a narrowed locating section 532. The passage section 531 and the locating section 532 are communicably connected to each other. The head portion 35*a* of the limiting section 3*a* is extended through the passage section 531, and the neck portion 36*a* of the limiting section 3*a* is engaged with the locating section 532.

Figure 24:
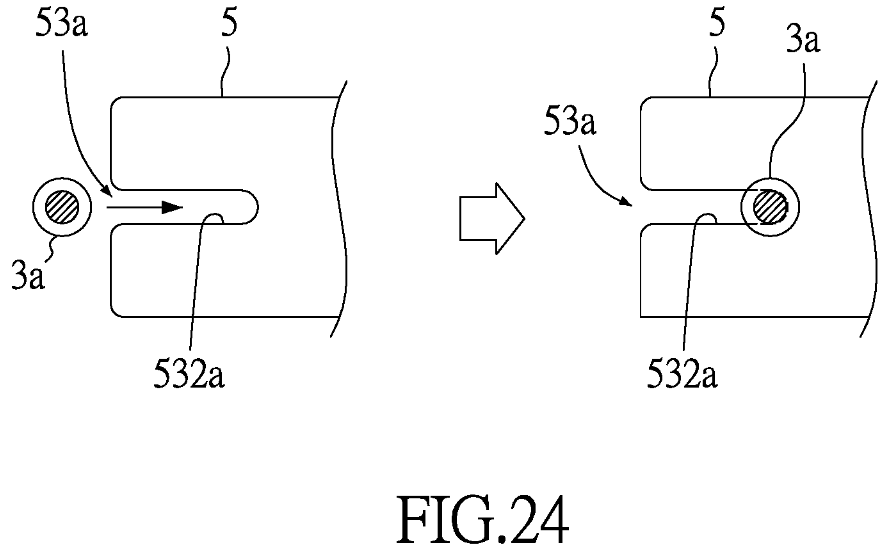
FIG. 24 shows a limiting section on a pull handle structure according to an eleventh embodiment of the present invention is engaged with a corresponding limiting section on a second object.

Please refer to FIG. 24 that shows a limiting section 3*a* on a pull handle structure according to an eleventh embodiment of the present invention is engaged with a corresponding limiting section 53*a* on a second object. As shown, in the eleventh embodiment, the corresponding limiting section 53*a* has a locating section 532*a*, with which a neck portion 36*a* of the limiting section 3*a* is engaged.

The present invention has been described with some preferred embodiments thereof and it is understood that the preferred embodiments are only illustrative and not intended to limit the present invention in any way and many changes and modifications in the described embodiments can be carried out without departing from the scope and the spirit of the invention that is intended to be limited only by the appended claims.

What is claimed is:

1. A pull handle structure, comprising:

a carrier being mounted on a first object;

a pull handle being movably assembled to the carrier; and a limiting section being located on the pull handle for interfering with a second object, the limiting section including only two protrusions, the two protrusions being a first limiting portion and a second limiting portion of the pull handle;

wherein the pull handle has a corresponding coupling section, the pull handle and the carrier are directly connected and turnably coupled to each other via the corresponding coupling section;

wherein the first limiting portion and the second limiting portion are each directly connected to the corresponding coupling section, and the second object is fixed relatively to the first object, the first limiting portion directly engaging a corresponding limiting section to apply a force to the corresponding limiting section of the second object to move the first object with the carrier in a first movement direction parallel to the second object as the pull handle is moved in a first direction, and the second limiting portion directly engaging the corresponding limiting section to apply a force to the corresponding limiting section of the second object to move the first object with the carrier in a second movement direction opposite to the first movement direction as the pull handle is moved in a second direction opposite to the first direction, the first movement direction and the second movement direction being a linear direction;

wherein the corresponding coupling section is a post;

wherein the corresponding coupling section is located between the first limiting portion and the second limiting portion;

wherein the corresponding limiting section is a post that extends upwardly from a top surface of the second object so that the corresponding limiting section extends above the top surface of the second object;

wherein the first limiting portion and the second limiting portion do not move relative to the pull handle.

2. The pull handle structure as claimed in claim 1, characterized in that the second object is interfered with the limiting section via a corresponding limiting section.

3. The pull handle structure as claimed in claim 2, characterized in that the corresponding limiting section can be a recessed section, a recess, a through hole, a protruded section, a post, a rod, a cambered member, a push-pull member, a hooking member, a flat member, a protrusion, a shaft, a wheel-like member, an externally threaded member, a female retaining member, a male retaining member, an internally threaded member, a block, a stepped section or a retaining member.

4. The pull handle structure as claimed in claim 1, characterized in that the carrier or the pull handle is provided with an elastic member, the elastic member pressing against the pull handle or the carrier so that the pull handle is elastically turnable.

5. The pull handle structure as claimed in claim 1, wherein the first limiting portion and the second limiting portion are V-shaped or U-shaped.

* * * * *